July 11, 1967 E. COHRT 3,330,911
PRIVATE AUTOMATIC BRANCH EXCHANGES
Filed March 27, 1964
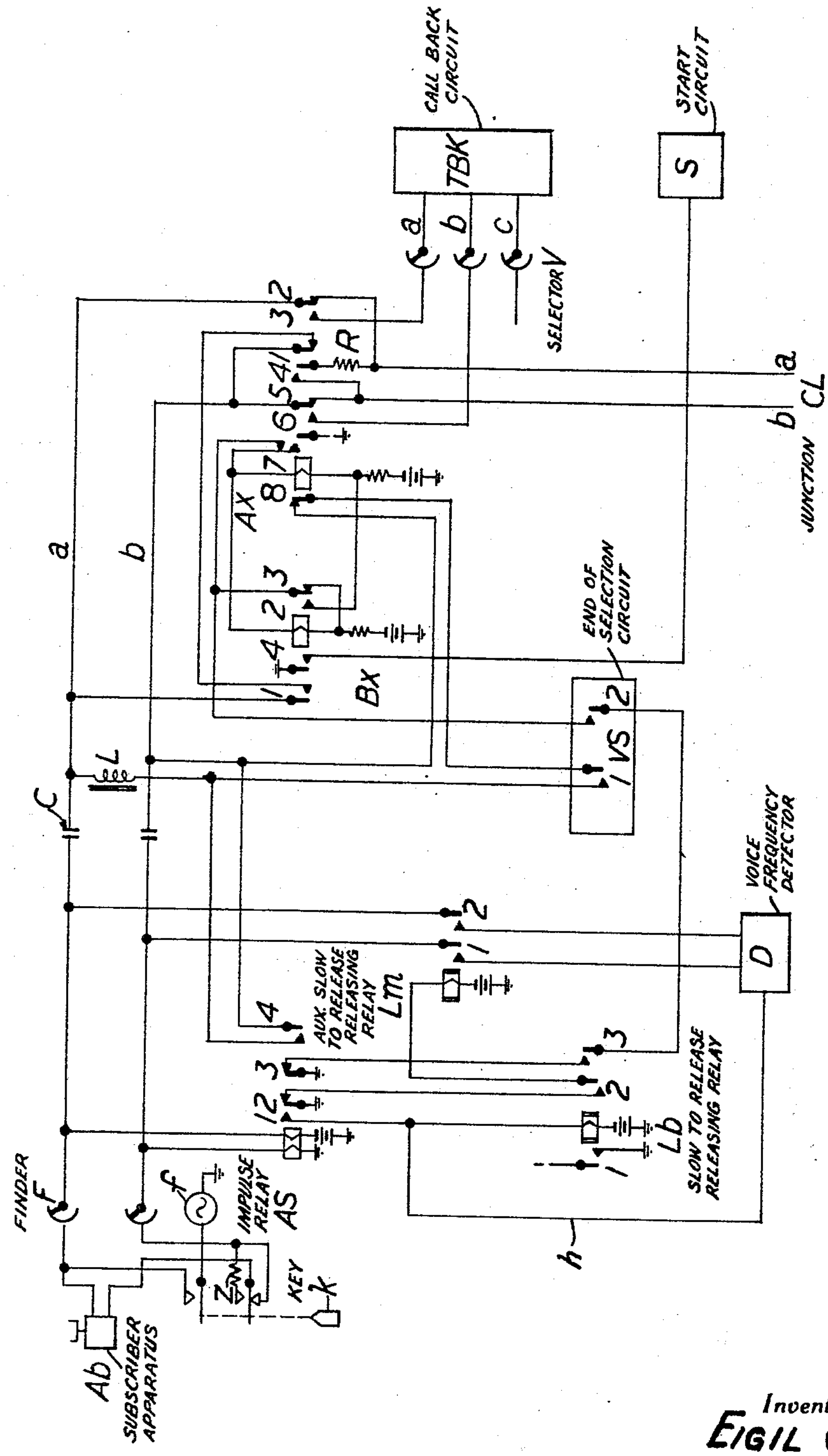
Inventor
EIGIL COHRT
By [signature]
Attorney 3,330,911

PRIVATE AUTOMATIC BRANCH EXCHANGES

Eigil Cohrt, Holte, Denmark, assignor to International Standard Electric Corporation, New York, N.Y., a corporation of Delaware Filed Mar. 27, 1964, Ser. No. 355,167
Claims priority, application Denmark, Apr. 5, 1963, 1,593/63
6 Claims. (Cl. 179—18)

ABSTRACT OF THE DISCLOSURE

A call transfer arrangement for adapting private automatic branch exchanges designed for direct current substations control to respond to control from a voice frequency pushbutton station to extend a calling path by altering the line impedance simultaneously with the transmission of a call back supervisory tone.

This invention relates in general to private automatic branch exchanges and in particular relates to such exchanges having call-back circuitry and also having facilities for both D.C. and voice frequencies signalling.

Private automatic branch exchanges that use both D.C. and VF signalling often provide separate circuitry for coupling VF and D.C. equipped subsets to call-back circuitry.

In such combined D.C. and VF signalling exchanges, the use of the dial digit "1" is known for making the loop-opening that is necessary for establishing a call-back from a D.C. dialing subscriber. The use of the digit "1" ensures that the loop-opening will not be of such a long duration that the slow-to-release releasing relay of the junction circuit which is magnetized over the closed subscriber loop has time to release and interrupt the connection. The connection of the call-back circuit may, for instance, take place responsive to the release of an impulse relay when the loop opens. The impulse relay switches a bistable relay circuit which thereby switches the *a-b* wires of the junction circuit from the junction to the call-back circuit and at the same time connects an impedance across the *a-b* wires in order to hold the connection to a public exchange.

Subscriber apparatus for voice frequency signalling is usually provided with a plurality of tone generators and set of keys or pushbuttons for switching-in required combinations of generators. When a call-back is made from such a subscriber apparatus, a detector is usually provided in the junction circuit for detecting a voice frequency signal transmitted from the subscriber apparatus. The detection of the voice frequency signal causes switching to the call-back circuit. If a VF detector is connected permanently to the *a-b* wires of the junction circuit, there is a problem in that it will be actuated by spurious signals, e.g. noise and talk. If the remote subscriber is part of a private automatic branch exchange there will furthermore be the risk that the call-back signal will pass through to the exchange and actuate the detector therein causing an unintended switching to take place in the call-back circuit of the remote private exchange.

Accordingly, it is an object of the invention to provide new and unique PABX's.

Another object of this invention is to provide private automatic branch exchanges of the kind in question in which the risk of unintended switching of call-back circuits is eliminated using simple and inexpensive circuitry.

A related object of this invention is to provide private automatic branch exchanges that establish a call-back from subscriber apparatus using voice frequency signalling and subscriber apparatus using the D.C. signalling in the same manner and by the same means.

Yet another object of this invention is to provide the private automatic branch exchanges arranged to avoid the de-magnetization of the releasing relay and the consequent release of the connection that may be caused by the increase of impedance occurring at the initiation of a call-back. It is well known to provide subscriber apparatus for voice frequency signalling comprising a keyboard having a special call-back key which causes the said increase of impedance when operated so that even a transistory operation of said key will make the releasing relay release. This invention provides an arrangement that avoids the untimely release of the release relay.

A further object of this invention is to provide a detector that is permanently connected across the line but is actuated only when it is needed and is not actuated by spurious signals.

A related feature of this invention is the increased safety obtained against spurious operation in that reset-signals are prevented from passing onto the junction.

In accordance with one aspect of this invention a private automatic branch exchange is provided wherein some of the subscriber's subsets are equipped for D.C. signalling while other subscriber subsets are equipped for VF signalling. In addition, call-back circuitry is provided for coupling local subscribers together. According to the invention, each of the VF signalling subsets is equipped to increase the impedance of the subscriber loop when a call-back call is initiated. The increased impedance operates a switching means such as a relay combination used for connecting the D.C. dialing systems to the call-back circuit. Simultaneously, a VF tone, detected by well known means, holds the release control relay operated.

The above-mentioned and other objects and features of this invention and the manner of attaining them will become more apparent and the invention itself will be best understood, by reference to the following description of an embodiment of the invention taken in conjunction with the accompanying drawing, wherein:

Subscriber apparatus A*b* is shown connected via one or more finder stages F to the *a-b* wires of a junction circuit of a private automatic branch exchange, a so-called PABX. The *a-b* wires in turn are connected through a junction CL to a public exchange through back contacts 2 and 5 of a relay A*x*. In a usual manner the junction circuit is provided with a fast operating supply and impulse relay A*s*, a slow-to-release releasing relay L*b* that is magnetized via a make contact 1 of relay A*s* when the subscriber loop is closed and does not get time to release during D.C. dialling, and a slow-to-release relay LM that is magnetized during D.C. dialling via a back contact A*s*2 and a make contact L*b*2 and is kept operated during every individual series of digit impulses but is released during the interval between two successive series of digit impulses. Further, the junction circuit is provided with a bistable relay circuit comprising, besides the previously mentioned relay A*x* a relay B*x*. The bistable relay circuit, at call-back serves to couple the *a-b* wires to a call-back circuit TBK through a selector V having associated start circuit S. The bistable relay circuit is arranged in a known manner so that relay A*x* operates at the beginning of the impulse first received and relay B*x* operates at the end of said impulse, and that relay A*x* is released at the beginning of the next impulse and relay B*x* at the end of said impulse. Further, the junction circuit comprises an end-of-selection circuit VS which is operated in a known manner (not known) and closes its contacts at the termination of dialling to the public exchange or to a local register either because a special end-of-selection signal is received or after the expiration of a certain delay after the transmission of the last digit signal. The end-of-selection circuit returns to the shown normal position with open contacts at seizure of the call-back circuit TBK or at release of the connection. The call-back circuit TBK in a known manner (not shown) assures that a subscriber making a call-back is connected to an idle local cord circuit, via which the conection to the wanted local subscriber is established.

A short description of a call-back from a subscriber apparatus equipped for D.C. dialling shall now be given. When the subscriber opens his loop, e.g. by dialling digit 1, impulse relay $As$ is released and relay $Ax$ is magnetized via back contact $As3$, make contacts $Lb3$ and VS2 and make-before-break contact $Ax7$. A short-circuit of relay $Bx$ is maintained via its own back contact 3. Relay $Ax$ is locked via its contact 7 and at its make contacts 3 and 6 switches the *a-b* wires to the selector V. At its make contact 4, it further connects a resistance R across the junction CL in order to keep the loop of the junction closed. When the call-back impulse, i.e. the opening of the subscriber loop, ceases, the short-circuit of relay $Bx$ ceases. Relay $Bx$ is then magnetized via contact $Ax7$ and via its make contact 4 operates the selector starting circuit S which causes the selector V to connect the call-back circuit TBK. When this happens the end-of-selection circuit VS again opens at contacts 1 and 2. When the subscriber—after having been connected by call-back circuit TBK to an idle local cord circuit and thereby to an idle register—has dialled the wanted local subscriber number, circuit VS is again under the control of contacts $As3$ and $Lb3$. When the subscriber wants to return to remote subscribers on junction CL he again opens the loop which short-circuits relay $Ax$ via contacts $As3$, $Lb3$, VS2 and $Bx2$. Relay $Ax$, therefore, is released and makes the desired resetting at its contacts 2 and 5. Relay $Bx$ remains magnetized via contacts $Ax7$, VS2, $Lb3$ and $As3$ but is released when the last mentioned contact is opened responsive to the termination of the open loop condition. Contacts VS1 and $Ax8$ in series with an inductor L established a D.C. loop for a connection with a public exchange subscriber at the junction-side of D.C. isolating capacitors C.

The junction circuit is further provided with a voice frequency detector D for use in establishing call-backs from subscriber apparatus equipped for voice frequency dialling. Detector D is connected to the *a-b* wires through make contacts 1 and 2 of relay $Lm$. Besides the digit keys such a subscriber apparatus is provided with a special call-back key K. The key K when operated connects a voice frequency generator *f* to the subscriber line, and increases the impedance of the subscriber loop sufficiently to cause the release of the impulse relay $As$.

Assume that the subscriber apparatus $Ab$ is of the voice frequency signalling type and that a call-back is to be made from said apparatus. When the subscriber depresses the call-back key, relay $As$ is released whereby relay $Ax$ is magnetized in the same manner as in the ordinary case described above the switches the *a-b* wires to the selector V. The voice frequency signal transmitted from the subscriber apparatus simultaneously with the increase of impedance is passed through make contacts of relay $Lm$ to the detector D which upon receiving said signal establishes a holding circuit for relay $Lb$ via a conductor *h*. Said holding circuit prevents relay $Lb$ and the connection from releasing even if the call-back key is kept depressed for a time longer than the releasing time of relay $Lb$.

The contacts of relay $Lm$ inserted in the connection between the *a-b* wires and the detector D cause the detector to be connected to said wires only when needed. Relay $Lm$ keeps the connection to the detector D interrupted in the normal talking condition of the junction circuit.

In other respects the call-back process takes place in the same manner as described above for a subscriber apparatus equipped for D.C. dialling. A back contact 1 of relay $Ax$ and a make contact 1 of relay $Bx$ short-circuit the junction during the increase of loop impedance by which the subscriber after being finished with the call-back resets himself to the junction. Any voice frequency signal transmitted simultaneously is thus prevented from reaching this line.

It is to be understood that the foregoing description of a specific example of this invention is not to be considered as a limitation on its scope.

I claim:

1. A private automatic branch exchange having both local D.C. dialling subscriber subsets and local voice frequency signalling subscriber subsets, call-back circuit means, means for completing a loop connecting one of said local subscriber subsets to a public exchange, means responsive to increased impedance in said loop for coupling said one local subscriber subset to said call back circuit means, dial means in said D.C. dialling subscriber subsets for increasing said impedance in said loop by opening said loop, and means in said voice frequency signalling subscribers subsets for increasing said impedance by inserting additional impedance in said loop.

2. A private automatic branch exchange having a plurality of local subscriber stations, D.C. dialling equipment at some of said local subscriber stations and voice frequency signalling equipment at other of said stations, junction means for completing a subscriber loop from said local stations to a public exchange, impulse relay means in said junction means energized over said loop under control of the one of said local voice frequency equipped subscriber stations that is connected to said loop, slow-to-release releasing relay means operated responsive to the operation of said impulse relay, key means in said voice frequency equipped subscriber station for increasing the impedance of said loop and returning said impulse relay to normal, call-back circuit means for interconnecting local subscribers, generator means operated responsive to the actuation of said key means in said voice frequency signalling equipment for transmitting a *v-f* signal over said loop indicative of a call-back call, detector means in said junction circuit operated responsive to detection of said *vf* signal for holding said releasing relay, and means responsive to said impulse relay at normal and said releasing relay operated for connecting said subscriber station to said call-back circuit.

3. The private automatic branch exchange of claim 2 wherein relay means are provided for connecting said detector only after said impulse relay returns to normal.

4. The private automatic branch exchange of claim 3 wherein said relay means is operated through normally open contacts on said releasing relay.

5. The private automatic branch exchange of claim 4 wherein means are provided for reconnecting said subscriber to said public exchange responsive to reoperation of said key after said call-back call ends.

6. The private automatic branch exchange of claim 4 wherein means are provided for short circuiting said loop to said public exchange during said call-back call.

No references cited.

KATHLEEN H. CLAFFY, *Primary Examiner.*

WILLIAM C. COOPER, *Examiner.*